(12) United States Patent
Gelsomini et al.

(10) Patent No.: US 7,855,812 B2
(45) Date of Patent: Dec. 21, 2010

(54) CELLULAR PHONE WITH SCANNING CAPABILITY

(75) Inventors: Tito Gelsomini, Plano, TX (US);
Harvey Edd Davis, Trenton, TX (US);
Andrew Marshall, Dallas, TX (US);
Pauline Wang, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1416 days.

(21) Appl. No.: 11/058,643

(22) Filed: Feb. 14, 2005

(65) Prior Publication Data

US 2005/0205671 A1    Sep. 22, 2005

Related U.S. Application Data

(60) Provisional application No. 60/544,665, filed on Feb. 13, 2004, provisional application No. 60/636,288, filed on Dec. 14, 2004.

(51) Int. Cl.
*H04N 1/04* (2006.01)

(52) U.S. Cl. .................. 358/474; 358/471; 358/473; 348/14.02; 348/E7.079; 235/472.03; 235/451; 382/173; 382/313

(58) Field of Classification Search .............. 358/474, 358/473, 497, 471, 478, 906; 235/384, 462.39, 235/478, 461, 472.03, 375, 462.06, 462.45, 235/451; 382/173, 182, 313, 314, 323; 348/14.02, 348/E5.002

See application file for complete search history.

(56) References Cited

U.S. PATENT DOCUMENTS

| | | | | |
|---|---|---|---|---|
| 5,083,218 A | * | 1/1992 | Takasu et al. | ............... 358/473 |
| 5,970,418 A | * | 10/1999 | Budd et al. | ................. 455/566 |
| 6,064,779 A | * | 5/2000 | Neukermans et al. | ....... 382/313 |
| 6,081,629 A | | 6/2000 | Browning | |
| 6,085,112 A | * | 7/2000 | Kleinschmidt et al. | ... 455/556.1 |
| 6,195,475 B1 | | 2/2001 | Beausoleil et al. | |
| 6,707,581 B1 | | 3/2004 | Browning | |
| 6,985,169 B1 | * | 1/2006 | Deng et al. | .................... 348/61 |
| 7,458,514 B1 | * | 12/2008 | Kitada | .................... 235/472.01 |
| 2002/0066786 A1 | * | 6/2002 | Saito | .......................... 235/454 |

(Continued)

*Primary Examiner*—Negussie Worku
(74) *Attorney, Agent, or Firm*—Warren L. Franz; Wade J. Brady, III; Frederick J. Telecky, Jr.

(57) ABSTRACT

A cellular phone is provided with a media scanning capability. Scanner optics, an optional light source and related scanning circuitry is integrated within a cellular phone to enable image or text scanning, facsimile, text-to-speech conversion, and language translation. Position sensors provide position data as the scanner is manually moved, in one or more passes across the scanned media, to enable a bit-mapped image of the strip to be created in a data buffer. Image data from the strips is processed to remove redundant overlap data and skew position errors, to give a bit-mapped final image of the entire scanned item. Image compression is provided to compress the image into standard JPEG format for storage or transmission, or into facsimile format for transmission of the document to any fax machine. Optical character recognition (OCR) is provided to convert image data to text which may be sent as email, locally displayed, stored for later use, or further processed. Further processing of text data includes language translation and text to speech conversion of either the original or translated text. The resulting speech audio can be heard locally or transmitted over the cellular network.

17 Claims, 4 Drawing Sheets

U.S. PATENT DOCUMENTS

2005/0205671 A1* 9/2005 Gelsomini et al. .......... 235/384
2006/0044609 A1* 3/2006 Kato et al. ................. 358/1.15
2006/0049259 A1* 3/2006 Kitada ........................ 235/451
2006/0081714 A1* 4/2006 King et al. ............. 235/472.03

* cited by examiner

CELLULAR PHONE WITH SCANNING CAPABILITY

CROSS-REFERENCE TO RELATED APPLICATIONS

This application claims priority under 35 U.S.C. 119 of U.S. Provisional Application Ser. No. 60/544,665, filed Feb. 13, 2004, entitled "Merged Scanner And Mobile Telephone"; and of U.S. Provisional Application Ser. No. 60/636,288, filed Dec. 14, 2004, entitled "Merged Scanner And Mobile Telephone."

BACKGROUND OF THE INVENTION

1. Field of the Invention

This disclosure relates to wireless telephony in general, and, in particular, to addition of scanning capability to a cellular telephone.

2. Description of the Related Art

Wired and wireless communication of voice, data, and images is increasing with expanding capabilities of networks and consumer devices, principally cellular phones. Business users and consumers alike employ a combination of wired and cellular telephones, facsimile, document scanners, voice, and text messaging to communicate with each other.

Modern cellular phones (commonly called, "cell phones") have voice, text, and low-resolution imaging capability, with integral cameras. Like text messages, these pictures can be transmitted to other cellular phones or email addresses. Alternatively the images can be saved to the cellular phone memory.

The resolution of most current cellular phone cameras is 640 (horizontal)×480 (vertical) pixels, or less. The low resolution and lack of close-focus capability make these cameras unsuitable for imaging text documents. For good text legibility, a typical Group 3 facsimile scan of an 8.5×11 inch document is at about 200 dots per inch (DPI), yielding 1728 pixels across the 8.5-inch document width. A camera (oriented vertically to image an entire page) with only 480 pixels across this same dimension would provide unacceptable results, even if the camera optics were capable of accurately focusing on the document. Camera modules with higher resolution are becoming available, but still lack the resolution needed to clearly image a document.

Linear scanners capable of 200 DPI and higher are widely used in flatbed scanners and facsimile machines. The document to be scanned is either moved past the linear scanner (typical in facsimile machines) or the scanner is moved past the document (typical in flatbed scanners). Both flatbed scanners and facsimile machines are widely used by business users and consumers. Portable scanners have been developed which are manually moved across a document to be scanned, in one or more passes depending on the scanner width and size of the document. These portable scanners typically have internal memory for storing the images scanned, which can later be transferred to a PC.

SUMMARY OF THE INVENTION

An apparatus and method is provided for combining an optical scanner with a cellular phone, enabling scanning of documents and storage or transmission of these documents.

In one aspect of embodiments described below, a linear optical scanning capability is incorporated within a cellular phone, enabling handheld scanning of documents and storage or transmission of these documents to one or more users, as a compressed image file or facsimile image. In a further aspect, optical character recognition (OCR) of scanned text further enables storage, email transmission, translation to other languages, and conversion to audio using text-to-speech algorithms, for local use or transmission on the cellular network.

The ability to scan, store, and send document images of high resolution using a cellular phone is a capability many business and casual users are likely to embrace. OCR, language translation, and text-to-speech conversion further enhance the usefulness of such a scanner.

Further benefits and advantages will be shown below.

DESCRIPTION OF THE VIEWS OF THE DRAWINGS

Throughout the drawings, like elements are referred to by like numerals.

DETAILED DESCRIPTION

Figure 1A:
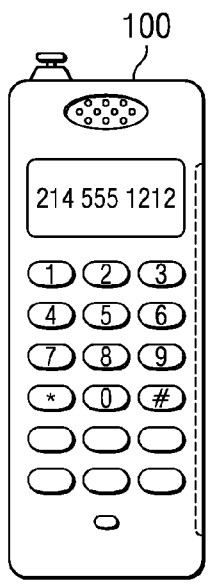
FIGS. 1A and 1B are front and side views, respectively, of an embodiment of a cellular phone having linear scanner optics positioned on a side of the phone housing.
Figure 1B:
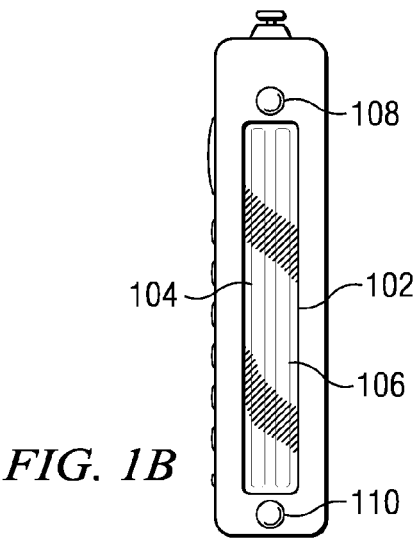

An embodiment of cellular phone with scanning capability shown in FIGS. 1A and 1B has scanner optics integrated within one side of the main housing of a cellular phone 100. The illustrated scanner optics includes a linear array 106 of photosensitive elements, having, for example, approximately 200 sensing elements per inch of span. A transparent optical window or lens cover 102 is positioned over the array to protect the sensing elements and to set the spacing distance between the scanned document or other media and the sensing elements as the side edge of the phone is pressed against the media for scanning. Ambient light or light from an internal source 104 is reflected from the document and is coupled to the sensor array 106.

The scanned media (for example, a document sheet of letter sized paper) will typically be larger than the field of view span of the scanner array 106, so multiple passes must be made across the media to capture the full view. This can be done by capturing the image in strips across the page. For this purpose, one or more optical or mechanical positional motion sensors 108, 110, similar to those used in a computer "mouse", are located on the same side of the housing as the scanner array 106. These motion sensors generate data on scan speed and indicate when the scanner is placed on or lifted off the page. Alternatively, an accelerometer may be housed within the phone to detect start and stop of scan for each strip, as well as reversal of direction at the end of each strip. Yet another alternative for motion sensing is to use software which examines the pixel data from the scanner element to determine speed and direction of scan. Determination of the beginning and end of each scanned strip facilitates electronic alignment and removal of redundant data of the strips on scan completion.

Figure 2A:
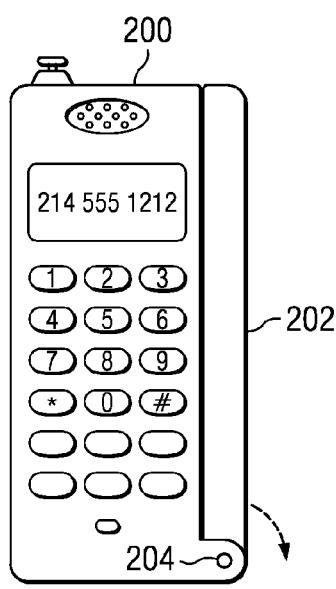
FIGS. 2A and 2B are front and side views, respectively, of another embodiment of cellular phone with scanner, having scanner optics positioned on a pivotable wand which can be rotated away from the main phone housing into an extended position for scanning (position in FIG. 2B and dot-dash line position in FIG. 2A), and rotated back against the main housing for storage and protection (solid line position in FIG. 2A).
Figure 2B:
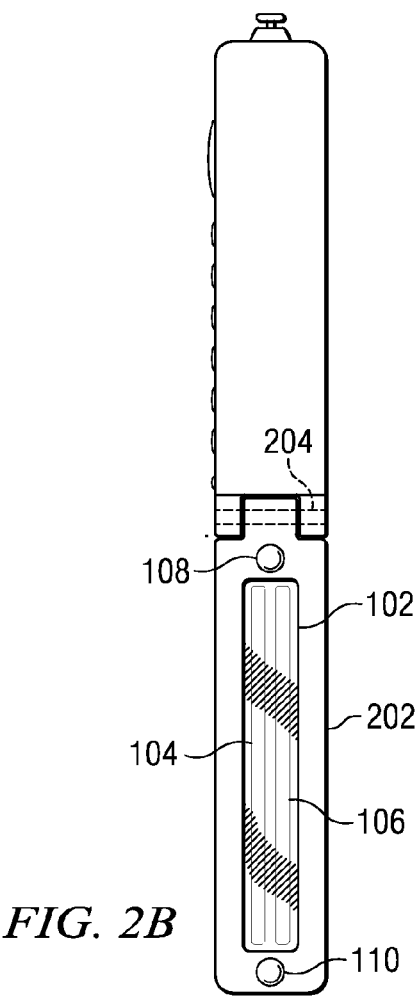

FIGS. 2A and 2B show another embodiment of cellular phone with scanner. Here the scanner optics is housed within a wand housing 202 that is dimensioned and configured to match the side edge of, and pivotally connected at one end to, the main phone case or housing 200. Wand housing 202 is configured for rotation about a pivot point 204 provided by a joint or hinge. When the wand housing 202 is rotated flush against the main phone housing (solid line position in FIG. 2A), the scanning aperture 102 faces inwardly toward the main housing 200, thus covering and protecting the aperture window from scratches or other damage. When utilized for scanning, the scanner wand 202 is rotated out from the main housing 200, within the plane of the main housing, into the extended position shown in FIG. 2B (dot-dashed line position in FIG. 2A).

Figure 3A:
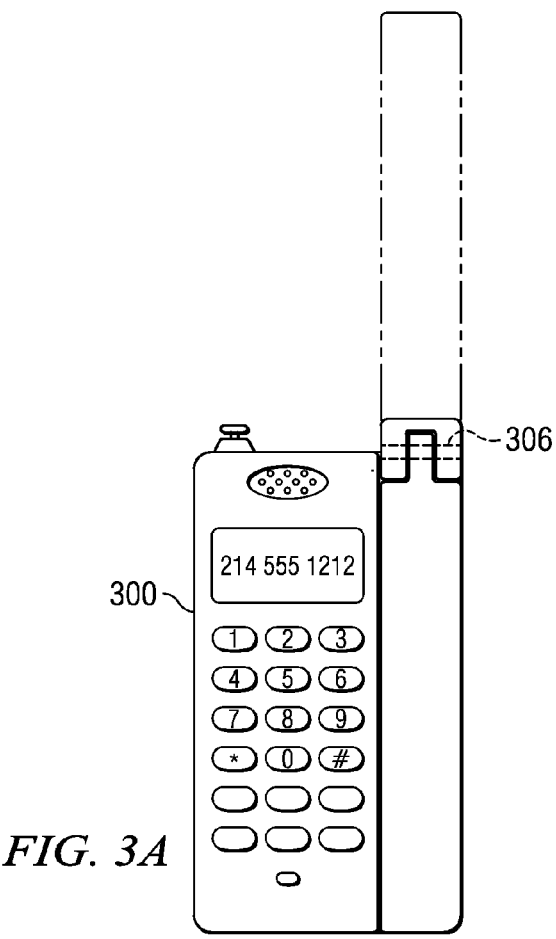
FIGS. 3A and 3B are front and side views of another embodiment of cellular phone with scanner, having a first pivotable scanner optics segment that rotates away from the main housing into alignment with a second scanner optics segment fixed on the main housing side, to provide a single, longer field of view.
Figure 3B:
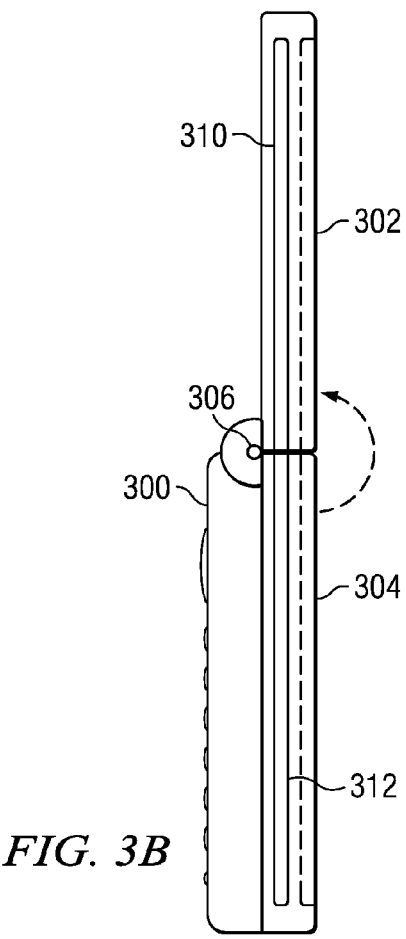

FIGS. 3A and 3B show an alternative phone with scanner which utilizes a two-segment scanner optics arrangement to give a linear scanning span of approximately twice as long as that of the embodiments of FIGS. 1A, 1B, 2A and 2B. Two linear scanning array segments 310, 312 are used, one on the side of the main phone housing, and the other on a hinged scanning wand 302. If desired, linear light sources may also be placed adjacent to each array. When stored, the wand 302 is pivoted about hinge 306 to minimize its size. Prior to scanning it is unfolded as shown in FIG. 3B and in the dot-dashed position of FIG. 3A. Many alternative mechanical configurations can provide such segmentation and folding. For example, the linear scanning arrays might be placed on two or more segments of a folding or telescoping scanning wand. Another mechanical embodiment might use a scanning wand which pulls out from the main phone housing and snaps in place, or a scanning element of arbitrary length on a flexible ribbon which is pulled out of the phone for use, and coils back into the phone for storage. Segmented scanner elements can also employ overlap of sensor area from segment to segment, to prevent a gap in scan coverage. The folded scanner, or one using mechanical alternatives described above, can be made long enough to scan a typical document (8.5 inch wide paper) in a single downward pass.

Figure 4A:
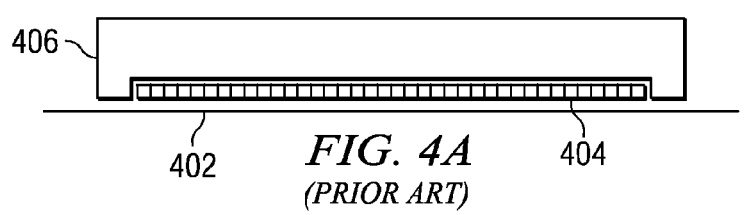
FIGS. 4A and 4B (prior art) are schematic front and side views, respectively, of a known contact scanner arrangement.
Figure 4B:
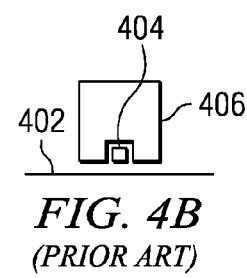

FIGS. 4A, 4B (prior art) and 4C, 4D (prior art) schematically illustrate known configurations of conventional, stand-alone contact and non-contact scanners. The contact scanner (FIGS. 4A, 4B) utilizes a linear array of photosensitive elements 404 equal in length to the maximum width of the field of view of the strip to be scanned. The photosensitive elements 404 are in direct contact with the surface of the media 402 to be scanned, protected from damage by a transparent optical window. A scanner with 200 dots per inch (DPI) resolution, and a width of 4 inches, for example, would have 800 photosensitive elements (pixels) equally spaced across the 4-inch span. Housing 406 provides physical support and electrical connections to the scanning elements. Both a front view (FIG. 4A) and side view (FIG. 4B) of this scanner arrangement are given for clarity.

Figure 4C:
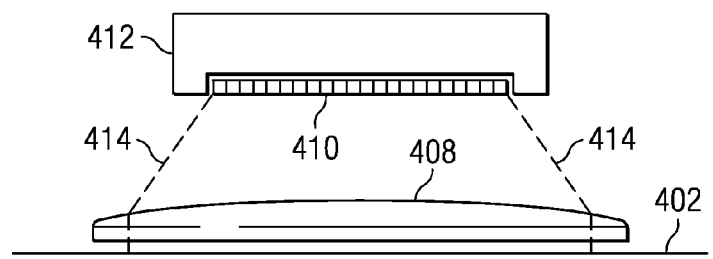
FIGS. 4C and 4D (prior art) are schematic front and side views, respectively, of a known non-contact scanner arrangements.
Figure 4D:
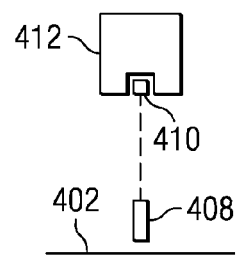

The non-contact scanner of FIGS. 4C, 4D (prior art) has a lens 408 with a flat side nearest the item to be scanned, and a curved side opposite the scan surface. This lens 408 refracts light coming from the scanned surface, bending the light rays to focus on a narrower region at the linear array of photosensitive elements (pixels) 410. Housing 412 supports the scanner array and provides electrical contact to the scan elements. Light rays 414 show the bending (redirection) of light by lens 408.

The contact scanner arrangement requires no optical system other than a protective window. It also occupies less volume in the enclosure. However, the area of active elements is large, which can increase the cost of the array. The non-contact scanner arrangement has the advantage of a smaller scan array, but requires more internal volume and a precisely formed lens. The contact scanner optics arrangement is the preferred approach for scanner optics in a phone with a wand such as shown in FIGS. 2A, 2B or FIGS. 3A, 3B. The optics of the single housing embodiment of FIGS. 1A, 1B can take the form of either the contact or non-contact scanner optics arrangement. The non-contact scanner, with appropriate optics and mechanical design, may use the same image sensor for scanning as is used for the camera in a cellular phone.

Figure 5:
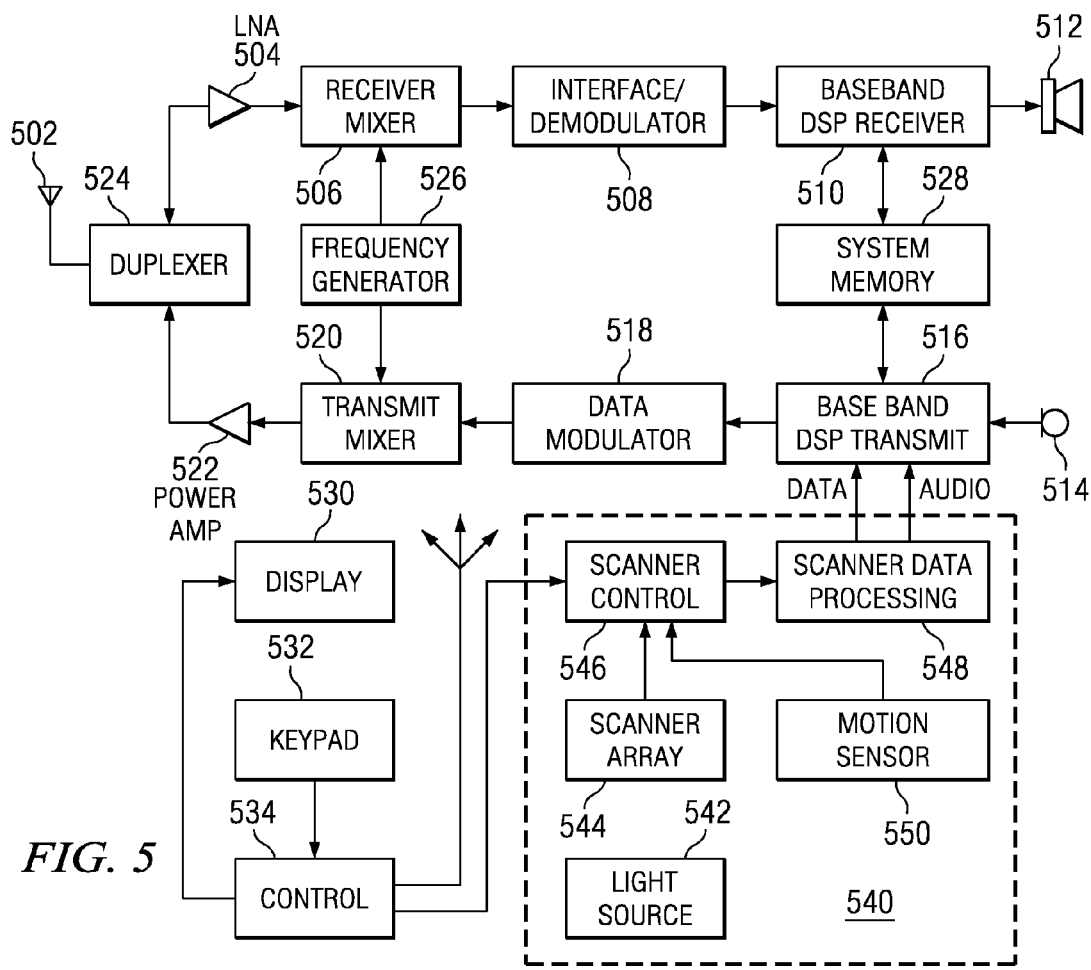
FIG. 5 is a block diagram of an embodiment of circuitry of a cellular phone in accordance with the invention, providing scanning and scanned data processing features.

FIG. 5 is a block diagram showing the functional elements of an example circuitry of a cellular phone with capability to support scanning and scanned data processing.

Received wireless cellular phone signals are picked up by the antenna 502, pass through a duplexer 524, and are amplified by a low noise amplifier (LNA) 504. The amplified signals are frequency-converted by a receive (RCV) mixer 506 to a lower intermediate frequency (IF), and demodulated to data in an intermediate frequency demodulator IF/DEMOD 508. The ensuing data is then routed to a baseband digital signal processing (DSP) receive (RCV) function 510, which outputs various system data, decodes highly compressed voice data, and generates analog voice audio. The audio is then output on a speaker 512.

Voice signals input to a microphone 514 drive a baseband DSP transmit (XMT) block 516. This block includes analog amplification, analog-to-digital (A/D) conversion of the voice signal, and voice coding circuitry, and outputs low-bit-rate data representative of the voice input signal. An alternate input to baseband DSP XMT 516 receives data from sources other than the voice coder. Voice and system data from block 516 is modulated onto an intermediate frequency (IF) carrier by a data modulator 518. The resulting modulated IF signal drives a transmit (XMT) mixer 520, which frequency-converts the signal to an appropriate output frequency. The output of mixer 520 drives a power amplifier (AMP) 522, which increases the level of the signal to drive antenna 502 through the duplexer 524, to transmit wireless cellular phone output.

A frequency generator 526 synthesizes both receive (RCV) and transmit (XMT) local oscillator signals which respectively drive the mixers 506 and 520. The received IF frequency will typically be the difference between the received input frequency and the receiver's local oscillator frequency; the transmit output frequency will typically be the sum of the data modulator output frequency and the transmitter's local oscillator frequency. Frequency generator 526 thus determines which channel the receiver is tuned to and which channel the transmitter uses.

A system memory 528 has a driven and driving connection to the RCV and XMT DSP subsystems 510, 516 as well as to an overall system control 534.

Control 534 is a microcontroller overseeing all aspects of the phone operation. It has inputs from a user cellular phone keypad 532, the baseband receive DSP 510, the system memory 528, and other functional blocks. It outputs control signals to most or all functional blocks, for example frequency setting data to frequency generator 526, human interface data to a display 530, and various data to both DSP functions 510 and 516.

Those skilled in the art will appreciate that a wide variety of functional partitioning is used in cellular phones; the preceding description is meant only as an example.

Scanner support 540 is added to provide scanner operation. Such support may include a light source 542 in the form of a linear light source, such as, for example, an array of light emitting diodes (LED's). Other light sources such as a cold cathode light source could also be used. Alternatively, a passive optical system could be used, such as a light pipe to route ambient light to the area being scanned, eliminating the power consumption and complexity of an active light source.

The support 540 also includes a scanner array 544 which can be a linear array of photosensitive elements. Either a monochrome or color scanner elements may be used. The example embodiment uses a contact scanner array, wherein the array length is the same length as the scanning aperture. Alternatively, a smaller scanner array can be used by adding appropriate reducing lens elements to project the aperture image onto the smaller sensor surface, such as shown in FIGS. 4C and 4D.

Scanner control 546 provides control signals to the scanner array which sequentially read out light intensity levels for every element of the array. Depending on the scanner array used, the intensity information at each element may be either analog or digital. If analog, the analog-to-digital (A/D) converter in 546 converts intensity levels to digital data.

Motion sensor 550 may take any of several forms. One is a roller ball and associated X, Y axis ball motion sensors, as in a computer mouse, providing 2-axis position data as long as the ball is in contact with the media being scanned. A rotating wheel, with its axis aligned with the long axis of the scanning array, is an alternative one-axis sensor. Either a one- or two-axis system can also be implemented with optical sensors, as in current optical mouse designs. While FIGS. 1A, 1B and 2A, 2B contemplate two such motion sensors, alternatively a single sensor can be used. Optical motion sensing can also be done using one or more elements of the scanning array, eliminating the need for additional mechanical or optical elements. A simpler embodiment may use manual start of scan, end of scan key(s) activated by the user, eliminating the need for more complex motion sensing.

Mechanical or optical motion sensing can also indicate whether the scanning array is in contact with the scanned document or not. For example, a mechanical ball or roller can activate a switch when pressed against the scanned surface. This contact/non-contact information is useful in determining the beginning and end of scanned strips.

The motion data from motion sensor 550 is input to scanner control 546. Scanner control 546 generates and stores intensity data and corresponding (approximate) position data as a bit-mapped image of each scanned strip. At the completion of each strip, the stored data is passed to scanner data processing 548.

Scanner data processing 548 thus has, at the completion of each page scan, stored intensity and position data for each scanned strip. The strip scans are "stitched" into a single bit-mapped image of the entire scanned page by removing redundant pixels and refining pixel position accuracy. Software stitching techniques like those employed with existing stand-alone handheld scanners can be used for such purpose. The image can be two-level black and white (B/W), gray scale, or full color, depending on the scanner array used.

Further processing of the final bit mapped image in scanner data processing block 548 provides image compression of B/W, gray scale, or color images, into a variety of standard compressed formats such as JPEG or facsimile. This compressed image data can be stored or transmitted as one of the above data types. Alternatively, for scans including text, optical character recognition (OCR) converts the scanned image into text data. This text data can then be stored (using much less memory than the original bit mapped image), translated into another language for display or output as audio, converted to audio using text-to-speech processing, transmitted either as data or audio, or output to the phone's speaker as audio.

Figure 6:
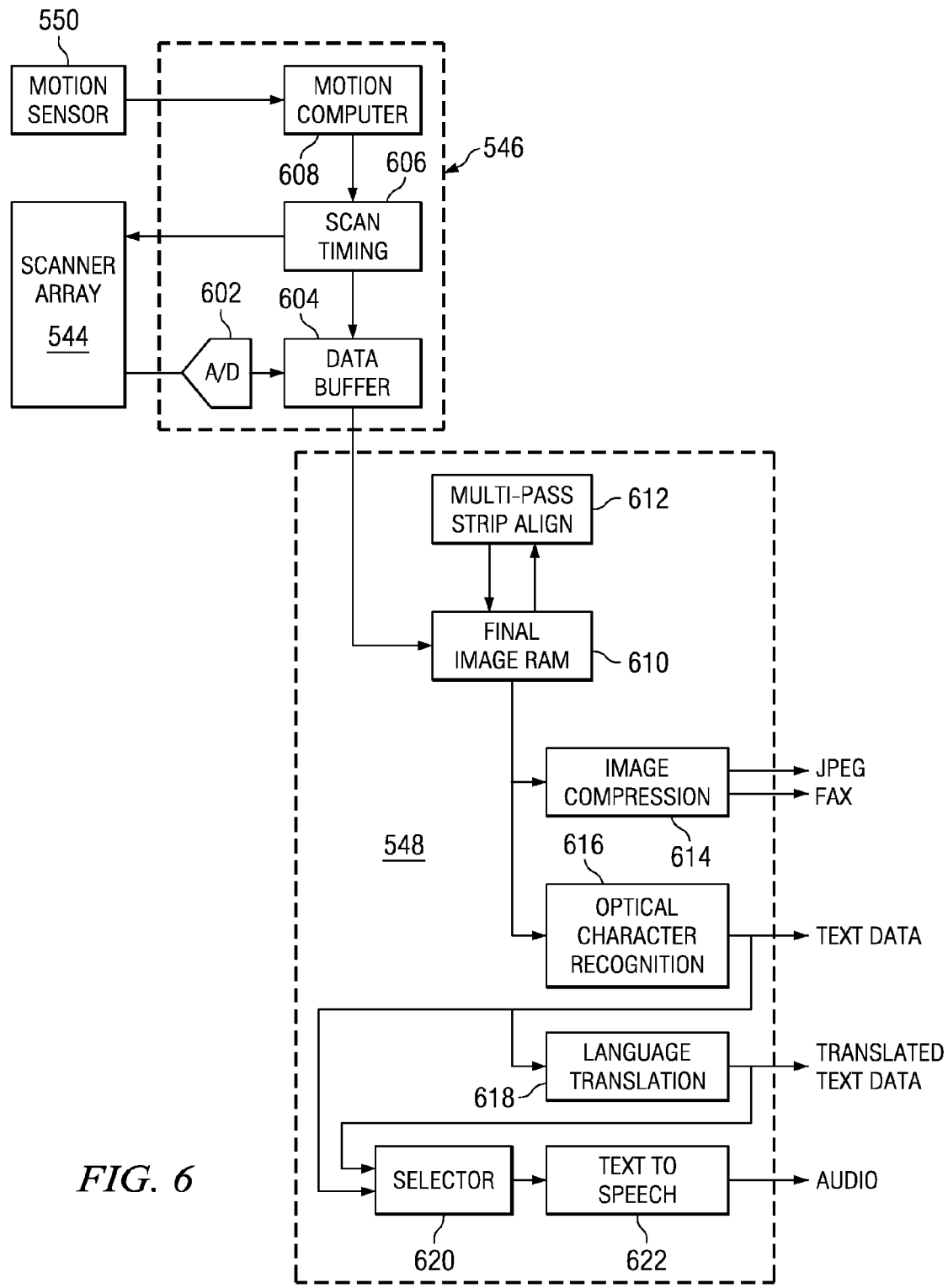
FIG. 6 is a block diagram showing details of an embodiment of scanner and data processing elements of FIG. 5.

FIG. 6 provides additional detail on scanner control function 546 and scanner data processing function 548. Scanner array 544, as previously described, may be a linear array of hundreds or thousands of photosensitive elements. The relationship between number of elements and scan length is given by $$\text{Scan length} = \text{number of array elements}/DPI \qquad 1)$$

For example, a 512-element array, with element density of 200 per inch (to provide 200 DPI resolution), will cover a scan length of $^{512}/_{200}$ inches, or approximately 2.5 inches. When the array 544 (for example, vertically oriented on the page to be scanned) is slowly moved horizontally across the page, scan timing circuit 606 provides signals to array 544 which sequentially activate or address each photosensitive element, and each element outputs to A/D 602 a voltage representative of the brightness on the page at that element position. The output of A/D 602 is thus a sequential digital representation of the brightness at each element position.

Motion computer 608 processes raw data from the motion sensor 550 to generate approximate scan speed and start of scan/end of scan signals. These motion signals are then input to scan timing block 606.

Scan timing block 606 clocks (controls the sequential readout of data) the scanner array, and thus has knowledge of the exact vertical position of each pixel in a strip. Scan timing 606 also has inputs from motion computer 608 which provide an approximate horizontal position for each pixel in the strip, based on start of scan and scan speed. This coarse position data is used to generate the appropriate memory address for each pixel in data buffer 604. Data for each pixel, from A/D 602, is stored at an appropriate location in data buffer 604. At the end of each strip scan, data buffer 604 thus has a bit mapped image of the scanned strip. This bit mapped image is then passed to final image RAM 610, and the data buffer 604 is cleared.

This process is repeated for each strip in the overall page scan. After all strips are scanned, pixel data for each strip is stored in a unique area of final image RAM 610. To insure capturing all information on a document, the user must overlap scan strips. Due to overlap of strips there is redundant data in final image RAM 610; there is also inaccuracy in position, especially horizontal position strip to strip.

The multi-pass strip align circuit 612 examines the data in the bit mapped image of final image RAM 610, looking for redundancy and position skew. Pixel data addresses are revised to eliminate this skew and redundancy, resulting in a much more accurate stored bit mapped image ready for additional processing.

Image compressor 614 takes bit mapped image data from final image RAM 610 and compresses it using one or more protocols, such as JPEG, CCITT Group 3 or Group 4 facsimile, or others. The resulting compressed image data can then be stored or transmitted as a file.

Optical character recognition 616 (OCR) takes bit mapped image data of a text document from final image RAM 610 and converts the image of each character in turn into text data. As in image scanning, overlap must occur from strip to strip to insure full coverage of the text document. As described above, the multi pass strip align 612 processes the bit mapped image to remove redundant pixels. An alternative when scanning text, eliminating the need for strip alignment and final image RAM, is to look for redundancy in the text data after OCR of text in each strip. Final text data is then stored or transmitted, or is made available for further processing.

Language translation 618 contains linked dictionaries of two or more languages, and on a word or phrase basis converts text data from OCR 616 to another language. The translated text data can be displayed, stored, or transmitted.

Selector 620 has as inputs both the original text and translated text, and selects one or the other for input to text to speech 622. Text to speech block 622 converts text words or phrases to audible speech (audio), which can be routed to the local speaker, or transmitted on the cellular system to a remote user. This provides the ability to scan text with the cellular phone, and have it "read" to a local or remote user.

Additional post processing functions can be included, such as fingerprint identification, bar code reading, and others.

Figure 7:
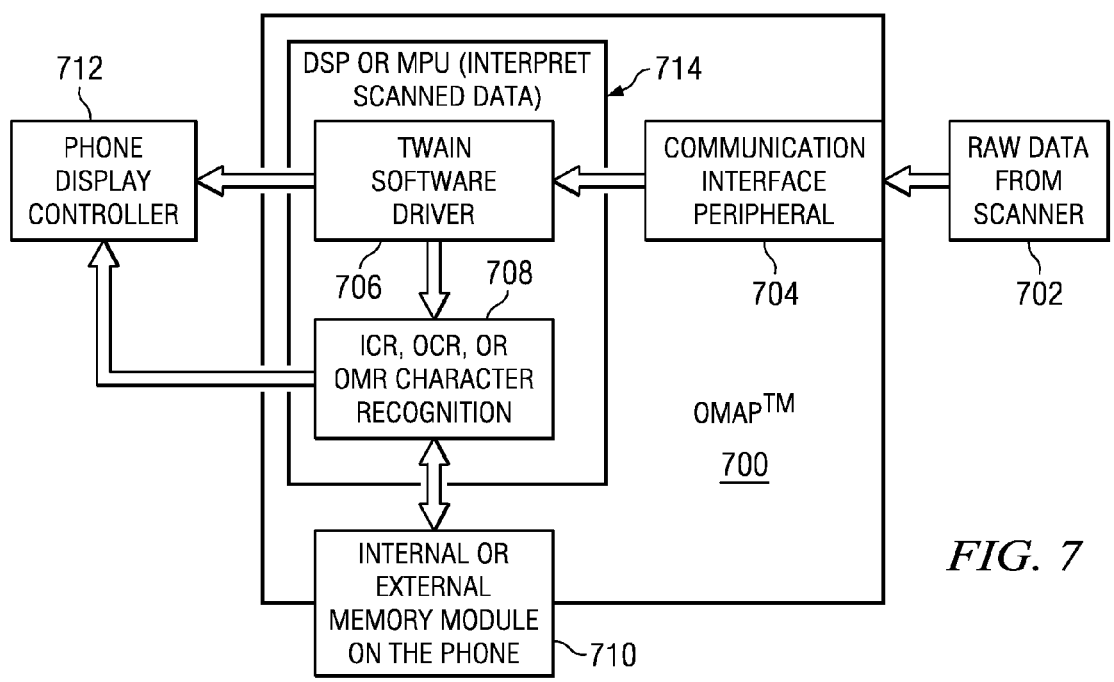
FIG. 7 is a block diagram showing an embodiment of the present invention using a digital signal processor and RISC (reduced instruction set computer) processor interface circuit between the scanner element and cellular phone.

FIG. 7 is a block diagram showing an example embodiment implemented using a device 700, such as a Texas Instruments OMAP (tm) device, interfaced to a scanner subsystem. Device 700 comprises a digital signal processor configured for operation in tandem with a RISC (reduced instruction set computer) processor, such as is widely used in cellular phones, particularly to enable enhanced functionality. Data from scanner subsystem 702 may be in a proprietary or standard protocol such as universal serial bus (USB). The communication interface peripheral 704 is customized to the appropriate input data protocol used by the scanner 702, and converts this protocol to an internal data flow used by the device 700.

Scanner data is further processed by one or more TWAIN-compliant software drivers 706. (The TWAIN Working Group is a not-for-profit organization representing the imaging industry whose purpose is to provide a universal public standard for linking software applications and image acquisition devices. Additional information on TWAIN-compliant software is available at www.twain.org.) One output of the processing in 706 is a compressed image in one or more formats such as JPEG or facsimile. In this case the resulting compressed image data is sent to the phone display controller 712 for display, storage or transmission. An alternate output of the TWAIN software driver block 706 connects to character recognition block 708, which provides conversion to text as described above. This text data is then routed to controller 712 for display, transmission, or further processing.

As described, scanner optics 106 and optional light source 104 enable a cellular phone to provide image and text scanning, facsimile capability, text-to-speech synthesis, and language translation. Position sensors 108, 110 or alternative position sensing capabilities give approximate position data as the scanner is manually moved, in one or more passes (field of view strips), across a document or other media being scanned. As each strip is scanned, a bit-mapped image of the strip is created in data buffer 604. Data from each strip is passed to a final image RAM 610 which, on completion of scanning, holds a bit-mapped image of the entire scanned page, in B/W, gray scale, or color. Multi-pass strip align 612 then processes the image data to remove redundant data (from strip overlap) and position skew (from errors in position during the scan), resulting in a more accurate bit-mapped image in final image RAM 610 of the entire scanned page or item. Image compression 614 compresses the bit-mapped image to standard JPEG format for storage or transmission, or compresses to facsimile format for transmission of the document to any fax machine. Optical character recognition (OCR) 616 converts the bit mapped image of text into text data which may be sent as an email, displayed on the local display, stored in RAM for later use, or further processed. Further processing of text data may include language translation 618 and text-to-speech 622 conversion of either the original or translated text. The resulting speech audio can be heard locally or transmitted over the cellular network to a remote location, such as to another cellular phone user. So, for example, a user can dial a number of another line or cellular phone user, establish a call connection with that user, scan a page, and have the scanned page read over the phone connection to the other user.

Those skilled in the art to which the invention relates will appreciate that yet other substitutions and modifications can be made to the described embodiments, without departing from the spirit and scope of the invention as described by the claims below.

What is claimed is:

1. A cellular phone with scanning capability, comprising:
an antenna for receiving and transmitting modulated wireless signals;
received signal processing circuitry for demodulating the modulated wireless signals received by the antenna;
output circuitry for transforming the demodulated signals into output data signals for presentation to a user;
input circuitry for transforming input from the user into input data signals;
input data signal processing circuitry for modulating the input data signals into modulated wireless signals for transmission by the antenna;
scanner optics including an array of photosensing elements for detecting light reflected from scanned media;
a motion sensor for detecting positional motion of the scanner optics relative to the scanned media;
scanner control circuitry for generating light intensity data signals based on reflected light detected by the array of photosensing elements, and for generating positional data signals based on positional motion detected by the motion sensor circuitry; and
scanner data signal processing circuitry for processing the light intensity data signals in coordination with the positional data signals to provide image data signals representative of the scanned media;
wherein the scanner data signal processing circuitry and the input data signal processing circuitry are coupled and configured to enable transmission by the antenna of modulated wireless signals representative of the image data signals; the scanner data signal processing circuitry comprises circuitry configured with optical character recognition capability to provide image data signals representative of text data in the scanned media, and with text-to-speech conversion capability to convert the text data representative image data signals to voice audio signals representative of the text data in spoken form; and the input data processing circuitry comprises circuitry for modulating the voice audio signals for transmission of modulated wireless signals representing the spoken text data by the antenna.

2. The cellular phone of claim 1, wherein the scanner data processing circuitry further includes circuitry configured with language translation capability to convert image data signals the text data representative to voice audio signals representative of the text data in spoken form, as spoken in a language different from the language of the text data.

3. The cellular phone of claim 1, wherein the output circuitry for transforming the demodulated signals into output data signals for presentation to a user comprises circuitry with capability to provide the output data signals in the form of voice audio signals, and a speaker output circuit for presenting the output data signals in the form of voice audio signals to the user; and wherein the scanner data signal processing circuitry and the received signal processing circuitry are coupled and configured to enable the voice audio signals representative of the text data in spoken form to be presented to the user via the speaker output circuit.

4. The cellular phone of claim 3, wherein the scanner data processing circuitry further includes circuitry configured with language translation capability to convert the text data representative image data signals to voice audio signals representative of the text data in spoken form, as spoken in a language different from the language of the text data.

5. The cellular phone of claim 1, further comprising a housing; and wherein the array of photosensing elements is positioned at a side of the housing for detecting light from scanned media against the side of the housing.

6. The cellular phone of claim 5, further comprising a light source within the housing positioned for illuminating scanned media against the side of the housing.

7. The cellular phone of claim 6, further comprising a transparent cover positioned over the array of photosensing elements at the side of the housing.

8. The cellular phone of claim 5, wherein the array of photosensing elements comprises a first array segment of photosensing elements for detecting light reflected from scanned media; and further comprising a movable member movable between first and second positions relative to the housing, and a second array segment of photosensing elements for detecting light reflected from scanned media positioned on the movable member; the second array segment being brought into known alignment with the first array segment at least when the movable member is moved to the second position, and the scanner control circuitry generating light intensity data signals based on reflected light detected by the aligned first and second array segments.

9. The cellular phone of claim 8, wherein the first and second array segments are linear array segments; the movable member comprises a scanning wand mounted on the housing for movement between a folded position in which the wand is flush against the housing side and an unfolded position with the second array segment linearly aligned with the first array segment.

10. The cellular phone of claim 1, further comprising a main housing and a wand housing; the wand housing being pivotally mounted on the main housing for rotation between flush and extended positions relative to the main housing; and the array of photosensing elements being at least partially positioned on the wand housing.

11. The cellular phone of claim 10, wherein the array of photosensing elements comprises a first linear array segment positioned on a side of the main housing and a second linear array segment positioned on the wand housing; the second linear array segment being brought into linear alignment with the first linear array segment to provide a single combined field of view when the wand housing is rotated from the flush to the extended position.

12. The cellular phone of claim 1, wherein the scanner optics further comprises a light source positioned for illuminating the scanned media.

13. The cellular phone of claim 12, wherein the array of photosensing elements comprises an array of photosensing elements having a long axis; and the motion sensor comprises two optical or mechanical positional motion sensors located in alignment with the long axis.

14. The cellular phone of claim 1, wherein the array of photosensing elements comprises a linear array of photosensing elements; and the scanner data signal processing circuitry is configured with a capability to provide composite image data signals representative of a composite bit-mapped image of the scanned media from successive image data signals representative of successive strip field of views of the scanned media seen by the linear array.

15. The cellular phone of claim 14, wherein the motion sensor includes a proximity sensor for mechanically or optically indicating the contact proximity of the array of photosensing elements to the scanned media.

16. The cellular phone of claim 1, wherein the received signal processing circuitry includes a duplexer connected to pass the modulated wireless signals received by the antenna, a low noise amplifier for amplifying the passed signals, a receive mixer for frequency-converting the amplified signals to a lower intermediate frequency, and an intermediate frequency demodulator for demodulating the frequency-converted signals; wherein the output circuitry comprises a speaker, and circuitry for transforming the demodulated signals into analog voice audio for output by the speaker.

17. The cellular phone of claim 16, wherein the input circuitry includes a microphone, and circuitry for transforming analog voice input received from user speech inputs at the microphone into voice audio signals representative of the analog voice input; and wherein the input data signal processing circuitry includes a data modulator for modulating voice audio signals from the input circuitry into modulated intermediate frequency carrier signals, a transmit mixer for frequency-converting the modulated intermediate frequency carrier signals to modulated output frequency signals, a power amplifier for amplifying the modulated output frequency signals, and a duplexer for passing the modulated output frequency signals for transmission by the antenna.

* * * * *